United States Patent [19]
Derbes

[11] Patent Number: 6,114,448
[45] Date of Patent: *Sep. 5, 2000

[54] FLUOROPOLYMER COMPOSITIONS AND PREPARATION AND USES THEREOF

[75] Inventor: Doug M. Derbes, Aiken, S.C.

[73] Assignee: The Louisiana Partnership for Technology and Innovation, Baton Rouge, La.

[ * ] Notice: This patent issued on a continued prosecution application filed under 37 CFR 1.53(d), and is subject to the twenty year patent term provisions of 35 U.S.C. 154(a)(2).

[21] Appl. No.: 08/950,879

[22] Filed: Oct. 15, 1997

Related U.S. Application Data

[63] Continuation of application No. 08/268,646, Jun. 30, 1994, abandoned.

[51] Int. Cl.$^7$ ....................................................... C08F 8/00
[52] U.S. Cl. .......................... 525/104; 525/101; 525/102; 428/421; 428/422; 428/484
[58] Field of Search ................................. 428/484, 421, 428/422; 525/101, 102, 104

[56] References Cited

U.S. PATENT DOCUMENTS

| | | | |
|---|---|---|---|
| 2,710,290 | 6/1955 | Safford et al. | 260/41 |
| 2,907,795 | 10/1959 | Wolff | 260/614 |
| 2,934,515 | 4/1960 | Konkle et al. | 260/45.5 |
| 2,940,947 | 6/1960 | Welch et al. | 260/29.1 |
| 3,103,490 | 9/1963 | Green | 252/15 |
| 3,223,739 | 12/1965 | Teumac | 260/633.1 |
| 3,314,889 | 4/1967 | Christian | 252/49.6 |
| 3,453,210 | 7/1969 | Wright | 252/28 |
| 3,671,429 | 6/1972 | Wright | 252/25 |
| 5,077,362 | 12/1991 | Watanabe et al. | 526/255 |
| 5,256,745 | 10/1993 | Grootaert | 526/194 |

*Primary Examiner*—Helen L. Pezzuto
*Attorney, Agent, or Firm*—Roy, Kiesel & Tucker

[57] ABSTRACT

A composition is provided which comprises a substantially homogeneous semi-solid intimate mixture of (i) over 85% by weight of finely divided particles of at least one fluoropolymer and (ii) less than 15% by weight of at least one normally liquid polysiloxane. A semi-solid wax-like composition of the invention and a liquid waxy composition of the invention can be used to reduce the friction properties of a variety of substrate materials.

18 Claims, No Drawings

6,114,448

FLUOROPOLYMER COMPOSITIONS AND PREPARATION AND USES THEREOF

This is a continuation of application Ser. No. 08/268,646 filed on Jun. 30, 1994, now abandoned.

TECHNICAL FIELD

This invention relates to novel fluoropolymer compositions that have a highly desirable novel combination of properties, to the preparation of such compositions, and to novel and highly important applications for which such compositions are eminently well suited.

BACKGROUND

Fluoropolymers such as polytetrafluoroethylene ("PTFE") and hexafluoropropylene-tetrafluoroethylene copolymers ("HFP-TFE") have a number of desirable properties for a number of applications. For example, in general they have high thermal stability, high chemical inertness, low frictional properties, high electrical resistance, high solvent resistance and high impermeability to liquids and gases.

Over the years considerable efforts have been expended in devising ways of modifying these polymers in order to render them more suitable for particular end uses. Typical of such efforts are the following:

U.S. Pat. No. 2,710,290 to Safford et al. describes mixtures of an organopolysiloxane of the type that is convertible by heat to the cured, solid elastic state and a minor proportion—preferably less than 25% by weight—of fibers of solid PTFE randomly dispersed in the organopolysiloxane. The patent also describes the cured or vulcanized products formed from mixtures of these two components together with a curing agent such as benzoyl peroxide and fillers such as silica aerogel or diatomaceous earth.

U.S. Pat. No. 2,934,515 to Konkle et al. describes PTFE-silicone compositions suitable for use in forming gaskets. These compositions are formed by milling an organopolysiloxane gum with dry particles of solid PTFE whereby the shearing action of the mill causes the PTFE particles to deform and elongate, forming fibers in the gum. The milled mixture is then vulcanized, preferably by heating the milled mixture with an organic peroxide. Reference is made in the patent to use of 20 to 80 parts by weight of the organopolysiloxane gum per 100 parts by weight of the PTFE.

U.S. Pat. No. 2,940,947 to Welch et al. points out that prior attempts to soften fluorine-containing polymers had been unsuccessful because of the incompatibility of conventional softeners such as silicone oils with the fluoropolymers. In circumventing this problem the patentees found it possible to increase the tensile strength and decrease the hardness of the fluoropolymers by incorporating the softener or plasticizer such as silicone oil into fluoropolymers in the presence of a finely-divided, hydrated siliceous pigment having an average ultimate particle size below 0.1 micron.

U.S. Pat. No. 2,907,795 to Wolfe describes certain fluorine-containing co-telomers which are high boiling liquids indicated to be specially useful as lubricants at extreme ranges of temperature.

U.S. Pat. No. 3,103,490 to Green describes wax-like fluorocarbon telomer compositions comprising a fluorocarbon telomer and an ester of orthotitanic acid. The compositions are indicated to have improved abrasion resistance, desirable lubricating properties and improved adhesion to the surface of materials to which they are applied.

U.S. Pat. No. 3,223,739 to Teumac refers to pyrolytic degradation of PTFE as a way of producing fluorocarbon waxes. It is stated that such pyrolysis usually produces 60% yields of waxes, the remainder being low boiling fluorocarbons and a small amount of carbon, which can be a highly activated form of carbon.

U.S. Pat. No. 5,077,362 to Watanabe et al. describes vinylidene fluoride copolymers comprising as monomer units at least 50 mol % of vinylidene fluoride and at least 0.1 mol % of an organosilicon compound containing at least one silicon-bonded vinyl group and at least one acryloyloxy or methacryloyloxy or vinyloxy group in the molecule. It is indicated that the copolymers can be dissolved in fluorine-containing solvents such as trichlorotrifluoroethane and hydrocarbon solvents such as cyclohexane to form solutions useful for producing thin films or coatings having good weather and chemical resistance.

U.S. Pat. No. 5,256,745 to Groothaert refers to preparing fluorine-containing polymers by conducting the polymerization of a fluorine-containing ethylenically unsaturated monomer, e.g., tetrafluoroethylene, under free-radical conditions in a mixture which contains a non-free radically polymerizable organometallic comprising a group IV metal atom, e.g., Si, and an aliphatic carbon atom bonded directly to that metal atom and to a hydrogen atom, e.g., a tetraalkylsilane, tetraalkylstannane, or tetraalkylgermane. The resultant polymers are indicated to have a saturated carbon-to-carbon backbone chain whose interpolymerized units are derived from the ethylenically unsaturated monomers, and at least one organometallic group derived from the organometallic compound, which organometallic group preferably terminates a polymer chain or branch as an end group. The polymers can be compounded and cured.

SUMMARY OF THE INVENTION

This invention provides, inter alia, fluoropolymer compositions having a highly desirable combination of properties which enables these compositions to be put to use in a number of new applications wherein these properties can give rise to substantial advantages.

More particularly, despite the well-recognized resistance of fluoropolymers such as PTFE and HFP-TFE to solvents and plasticizers, it has now been found possible pursuant to this invention to prepare semi-solid (e.g., wax-like) fluoropolymer compositions that contain a high proportion of the fluoropolymer. Accordingly, pursuant to one of its embodiments this invention provides a composition which comprises a substantially homogeneous semi-solid intimate mixture of (i) over 85% by weight of finely-divided particles of at least one fluoropolymer, preferably a perfluoropolymer, and most preferably PTFE, and (ii) less than 15% by weight of at least one normally liquid polysiloxane, most preferably a normally liquid poly(dimethylsiloxane). Preferably the amount of (i) is from 90% to 95% by weight and the amount of (ii) is from 5% to 10% by weight, the total of (i) and (ii) being 100%. One particularly preferred composition of this invention consists essentially of an intimate substantially uniform mixture of about 95% by weight of PTFE and about 5% by weight of poly(dimethylsiloxane). This mixture is a gelatinous semi-solid that possesses a number of highly beneficial properties described hereinafter.

Another aspect of this invention is the discovery that another class of novel and highly useful substantially homogeneous fluoropolymer compositions can be prepared by suitably combining a normally solid paraffinic hydrocarbon with a fluoropolymer and a normally liquid polysiloxane. In this embodiment of the invention, the inclusion in the compositions of a small percentage (e.g., about 5% to about 20% by weight) of a normally solid mineral paraffin such as a paraffin wax (a relatively inexpensive material) makes it possible to reduce the amount of fluoropolymer (a relatively expensive material) used in the formulation to a level as low as about 50% by weight without any significant reduction in performance properties of the finished composition. Moreover, the inclusion of the mineral paraffin component makes it possible to formulate a variety of end products ranging from waxy semi-solids to liquid waxy compositions.

Accordingly this invention additionally provides a composition which comprises a substantially homogeneous intimate mixture of (i) at least about 50% by weight (preferably in the range of about 55% to about 75% by weight, and more preferably in the range of about 55% to about 65% by weight) of finely-divided particles of at least one fluoropolymer, preferably a perfluoropolymer, and most preferably PTFE, (ii) at least about 20% by weight (preferably about 25% to about 45% by weight) of at least one normally liquid polysiloxane, most preferably a normally liquid poly(dimethylsiloxane), and (iii) from about 1% to about 25% by weight (preferably from about 5% to about 20% by weight) of a normally solid substantially paraffinic hydrocarbon. Preferably the total amounts of (i), (ii) and (iii) are equal to 100%. One group of particularly preferred compositions of this embodiment of the invention are liquid waxy compositions that consist essentially of an intimate substantially uniform mixture of about 50% by weight of PTFE, about 42% to about 45% by weight of poly(dimethylsiloxane), and about 5% to about 8% by weight of a mineral paraffin wax. Compositions from this group can be used, for example, in the form of spray waxes. Another group of particularly preferred compositions of this embodiment of the invention are paste wax compositions that consist essentially of an intimate substantially uniform mixture of about 55% by weight of PTFE, about 25% to about 30% by weight of poly(dimethylsiloxane), and about 15% to about 20% by weight of a mineral paraffin wax.

The compositions of this invention are devoid of solid particulate fillers such as diatomaceous earth, silica aerogels, hydrated siliceous pigments, alumina, silica, silica-alumina, etc., and are not subjected to curing, cross-linking or vulcanization with curing agents such as peroxides or the like.

The discovery of these new compositions is deemed highly remarkable in view of the state of the art. For example in the *Encyclopedia of Polymer Science and Technology*, copyright 1970 by John Wiley & Sons, Inc., Volume 13, it is stated at page 437:

Although over several hundred solvents have been tested, no material has been found that will dissolve or even swell polytetrafluoroethylene below 300° C. Only a few reagents cause a weight gain in polytetrafluoroethylene even though the polymer has been exposed to the reagents at elevated temperatures for extended periods of time. It is very likely these recorded weight gains are merely a manifestation of reagent filling microvoids in molded pieces and are not due to plasticization or swelling.

The compositions of this invention made from components (i) and (ii) and without component (iii) are best prepared by introducing the finely-divided fluoropolymer portionwise into a blending vessel containing the initially liquid polysiloxane while continuously agitating the resultant mixture. In this operation the polysiloxane is absorbed into the interior of the fine particles of fluoropolymer to produce a gelatinous semi-solid product of this invention.

A generally similar procedure can be used for making the compositions of this invention in which component (iii) is used in conjunction with components (i) and (ii). However in this case, the polysiloxane is initially preheated to an elevated temperature (e.g., in the range of about 90° C. to about 95° C., and preferably about 93° C.), and the melted paraffinic hydrocarbon is introduced into the preheated polysiloxane. While continuously agitating the mixture, such as by use of a mechanical stirrer, the mixture is allowed to cool to room temperature. Thereupon, the finely-divided fluoropolymer is introduced portionwise into cooled polysiloxane-paraffinic hydrocarbon mixture.

It has been discovered that the mineral paraffin material will absorb a wide variety of polysiloxanes of differing viscosities. This absorption of silicones by mineral paraffin results in the paraffin changing from its normal hard solid condition (at room temperature) to a soft gel or viscous liquid depending upon the proportions used.

The mineral paraffin provides improved rheological properties. For example, the paraffin provides yield point and gel strength to the siloxane fluid enabling suspension of the finely-divided fluoropolymer in the siloxane-paraffin mixture without settling over time in storage. In fact, the addition of a mineral paraffin to a polysiloxane such as the dimethyl silicone fluids results in changing the silicones from Newtonian fluids to non-Newtonian fluids exhibiting plastic flow with thixotropy.

Another aspect of this invention is the discovery that the semi-solid wax-like compositions of this invention and the liquid waxy compositions of this invention can be used to reduce the frictional properties of a variety of substrate materials. This is accomplished by applying the composition to and spreading it thinly over the solid surface to be treated. For best results, the surface to which the composition is applied should be kept clean and free of foreign particles of dirt, dust or other contaminants. The clean thinly coated surface is then wiped or buffed to produce a surface that has a dry appearance. The resultant coating is highly stable and substantially reduces the coefficient of friction of the surface to which it has been applied.

These and other embodiments, features, and advantages of this invention will become still further apparent from the ensuing description and appended claims.

DETAILED DESCRIPTION

Component (i).

The fluoropolymer used in the practice of this invention contains a preponderance of carbon-to-fluorine bonds. Although the fluoropolymers can contain carbon-to-carbon unsaturation in the molecule, the preferred polymers are saturated polymers (i.e., they are devoid or essentially devoid of carbon-to-carbon unsaturation).

In general, the fluoropolymers utilized in the practice of this invention are solids having high thermal stabilities. In other words they are stable in air at temperatures higher than the highest temperature at which the corresponding non-fluorinated polymer remains stable under the same conditions. The fluoropolymers used are, in addition, solvent-resistant, i.e., they are substantially impermeable to ordinary solvents such as hydrocarbons, chlorinated hydrocarbons, and ethers. However, they are, pursuant to this invention, substances which are permeable to the particular polysiloxane fluid utilized therewith whereby the fluoropolymer actually absorbs the polysiloxane. This phenomenon can readily be observed in the case, for example, of finely divided polytetrafluoroethylene (PTFE) and poly(dimethylsiloxane) fluid (PDMS fluid) by exposing the interior of a PTFE particle that has been immersed in PDMS fluid to ultraviolet light. Under these conditions the interior of the particle exhibits fluorescence. This shows that the fluoropolymer has actually absorbed the polysiloxane, because PDMS fluid exhibits fluorescence when exposed to UV light, whereas PTFE itself does not.

Preferred fluoropolymers meeting the requirements set forth above are highly fluorinated fluoropolymers, i.e., polymers in which the ratio of fluorine atoms to carbon atoms is at least 1.2:1, more preferably at least 1.4:1 and most preferably at least 1.5:1.

The fluoropolymers used in forming the compositions of this invention can contain cross-linking provided the extent of cross-linking does not render the polymer incapable of absorbing the polysiloxane fluid selected for use therewith. Examples include poly-fluorinated phenol-formaldehyde resins or resols. Preferably however, the fluoropolymers are substantially linear polymers which, of course, are substantially devoid of cross-linking.

Among preferred fluoropolymers are the following:

a) perfluorocarbon polymers (i.e., polymers which consist of carbon and fluorine atoms);

b) preponderately perfluorocarbon polymers (i.e., polymers which consist of carbon and fluorine atoms, plus hydrogen atoms and/or chlorine atoms and/or nitrogen atoms numbering in total less than one-half the average number of fluorine atoms in the polymer); and c) perfluoroether polymers (i.e., polymers which consist of carbon, fluorine and oxygen atoms and in which at least two separate carbon atoms are bonded to an oxygen atom via an ether linkage, C—O—C).

Examples of preferred fluoropolymers include polytetrafluoroethylene, poly(perfluoropropylene), poly(perfluorostyrene), poly(perfluoroacrylonitrile), hexafluoropropylene-tetrafluoroethylene copolymers, and the like. The most preferred fluoropolymer is polytetrafluoroethylene.

In order to enable the polysiloxane fluid to penetrate and be absorbed in the fluoropolymer it is preferred to utilize the fluoropolymer in particulate or finely divided form. While the average particle size can vary, the average particle size of the fluoropolymer used is typically below about 8 microns, preferably below about 6 microns, and most preferably below about 4 microns. Products of this type are available commercially from a number of fluoropolymer manufacturers.

The fluoropolymers used pursuant to this invention can be produced in any of a variety of known techniques. For example, they can be produced by fluorinating the corresponding non-fluorinated polymer, such as polyethylene, polypropylene, polyisobutylene, ethylene-propylene copolymer, polystyrene, polyacrylonitrile, polyvinyl chloride, phenol-formaldehyde resins, resols, and many other fluorinatable polymers. In order to ensure extensive fluorination throughout the polymer, the fluorination is usually conducted using the initial polymer in finely divided or powdered form. Further details of this processing technique are given in the literature. See for example, J. L. Margrave and R. J. Lagow, *J. Polym. Sci. Polym. Lett. Ed.* 12, 177 (1974) and A. J. Otsuka and R. J. Lagow *J. Fluorine Chem.* 4, 371 (1974).

Other methods for the manufacture of fluoropolymers involve use of various direct polymerization techniques. Thus polytetrafluoroethylene can be produced by polymerizing tetrafluoroethylene either by suspension polymerization or by emulsion polymerization. The latter technique enables direct production of fine powder resin. Suspension polymerization tends to yield a granular product which after drying can be ground into finely divided resin. Once again the literature may be referred to for further details concerning procedures for producing a wide variety of suitable fluoropolymers. For example see Kirk-Othmer, *Encyclopedia of Chemical Technology*, 3rd Edition, Volume 11, copyright 1980 by John Wiley and Sons, Inc., for discussions and further references to literature on preparation and properties of polytetrafluoroethylene (pages 1–24), fluorinated ethylene-propylene copolymers (pages 24–35), tetrafluoroethylene copolymers with ethylene (pages 35–49), poly (chlorotrifluoroethylene) (pages 49–53), poly(vinylidene fluoride) (pages 64–74), and poly(fluorosilicones) (pages 74–81).

Suitable fluoropolymers for use in the practice of this invention are available from a number of well-known commercial producers.

Component (ii).

A variety of polysiloxane fluids is available for use in the practice of this invention. In general, these fluids are composed of a polysiloxane backbone substituted by pendant hydrocarbyl groups directly attached to the backbone by carbon-to-silicon bonds. The hydrocarbyl groups can be alkyl, alkenyl, cycloalkyl, aryl, and/or aralkyl groups containing any number of carbon atoms provided that the hydrocarbyl-substituted polysiloxane polymer is a liquid at ambient room temperatures and provided further that the liquid siloxane polymer is sufficiently absorbable by the finely divided fluoropolymer selected for use therewith to form a substantially homogeneous semi-solid (waxy or gel-like) intimate mixture of fluorocarbon and siloxane polymers.

One useful type of such siloxane fluid is composed of polysiloxanes in which the polysiloxane backbone is substituted exclusively by pendant hydrocarbyl groups directly attached to the backbone by carbon-to-silicon bonds. While the polysiloxane fluid may contain two or more different hydrocarbyl substituents (e.g., methyl and ethyl groups or methyl and vinyl groups or methyl and phenyl groups, etc.), the preferred siloxane fluids have one and only one type of hydrocarbyl substituent, such as methyl, ethyl, vinyl, phenyl or the like.

Another type of polysiloxane fluid is composed of a polysiloxane backbone substituted by pendant hydrocarbyl groups and by pendant polyoxyalkylene groups directly attached to the backbone by carbon-to-silicon bonds.

Among suitable polydimethylsiloxanes that can be used are the extensive series of dimethyl polysiloxane fluids available commercially from PPG Industries under the MASIL® trademark having pour points ranging from as low as −84° C. to as high as −25° C. These include MASIL SF 1000, MASIL SF 50, MASIL SF 5, and many others. MASIL SF 0.65, hexamethyl disiloxane, is also suitable. The extensive series of silicone fluids (trimethylsiloxy-terminated polydimethylsiloxanes available from United Chemical Technologies, Bristol, Pa.) with pour points as low as −100° C. and as high as −38° C. are also suitable for use.

Component (iii).

The mineral paraffins used in the practice of certain preferred embodiments of this invention are normally solid material at room temperature. In general, they are composed principally of mixtures of paraffinic hydrocarbons of sufficiently high molecular weight to form solids that melt in the range of about 66° C. to about 85° C. These normally solid hydrocarbon blends may contain amounts of other types of hydrocarbonaceous components that do not significantly alter the substantially paraffinic character of the mixture or its Theological properties when in the molten condition.

Ordinary so-called paraffin waxes are abundant low-cost materials suitable for this use. One particularly preferred material is S & A Paraffin Wax available commercially from Strohmeyer & Arpe Co., Inc., Short Hills, N.J.

Formulation.

For convenience, compositions of this invention made from components (i) and (ii) without use of component (iii) are referred to herein as "two-component compositions" to signify that component (iii) is not utilized therein even though more than two components may be used in their formation. Similarly, compositions of this invention made from components (i), (ii) and (iii) are referred to herein as "three-component compositions" to signify that at least one of each of components (i), (ii) and (iii) is used therein, even though more than a total of three components may be used in making these compositions.

Two-component compositions. To prepare these compositions of this invention the selected components (i) and (ii) are blended together by use of mechanical agitation, and staged or timed addition of component (i) to component (ii).

In a typical batch type operation, at the outset the proportions of the selected components (i) and (ii) and the final weight of the composition are determined. Then the selected amounts of the components are weighed out. Next component (ii)—the polysiloxane fluid—is charged into the blending vessel and the agitator is turned on. The finely-divided component (i) selected for use is then added in incremental portions while continuously stirring the contents of the blending vessel. Typically, one-tenth of the total amount of component (i) is added in timed intervals of from five to ten minutes depending upon the size of the batch being produced and the rate of agitation. In general the feed rate should be controlled such that each added quantity is given sufficient time in the agitated mixture to be homogeneously mixed into the contents of the vessel before the next portion of component (i) is added. The operation is discontinued when the product blend appears visually to be uniform and homogeneous.

The blending operation can be conducted at ordinary ambient room temperature conditions. Moderate heat can be applied to the agitated mixture in any case where this is deemed necessary, appropriate or desirable. Ordinarily, however, use of heat is not necessary.

It can thus be seen that two-component compositions of this invention can be readily prepared from readily-available starting materials without need for highly unusual formulation equipment or extensive power consumption for generation of heat or the like.

Three-component compositions. To prepare these compositions of this invention the selected components (ii) and (iii) are first combined and mixed together under carefully controlled elevated temperature conditions, and then cooled with continuous agitation to about room temperature. Thereafter, component (i) is blended with the component (ii)–(iii) mixture by use of mechanical agitation, and staged or timed addition of component (i) to the mixture, in the same manner as described above in connection with the two-component compositions.

In conducting the preblending of the polysiloxane and the substantially paraffinic hydrocarbon, careful temperature control is important, as the temperature must be high enough such that the paraffinic hydrocarbon absorbs the polysiloxane. Any attempt to blend silicone with paraffin at room temperature results in formation of an immiscible uncombined mass which is not suitable for use in making the three-component compositions. Thus, depending upon the particular makeup of the paraffinic hydrocarbon component and the polysiloxane component used, the temperature may be in the range from about 90° C. to about 95° C. With ordinary paraffin wax (mineral wax), a temperature of about 93° C. is normally satisfactory.

In conducting this preblending step between component (ii) and (iii), agitation is also very important. By continuously agitating the hot mixture of these components, the particle size of the paraffin is kept extremely small as the paraffin cools in the mixture. The polysiloxane is thus able to permeate the extremely small paraffin particles due to the mechanical agitation forces present in the blender. As a consequence of using the controlled temperature reduction and concurrent continuous agitation, the fine paraffin particles are changed from hard solids to gelatinous semi-solids which are uniformly homogenized into the polysiloxane by the agitation process.

The effect that the paraffin has on the polysiloxane is to change the rheological properties of the silicone oil from Newtonian flow to plastic or non-Newtonian flow. The silicone fluid has increased viscosity as well as gelling properties which allow the silicone fluid itself to suspend the fluoropolymer particles. As noted earlier, this thixotropic property of the paraffin-polysiloxane allows the weight percentage of the fluoropolymer in the final product to be reduced by as much as about 40%. Yet the resultant product has high performance and can be used, depending upon particular proportions used in making the product, in either paste or liquid form at a much lower cost.

Properties.

The compositions of this invention have properties rendering them eminently suited for use in a number of important end use applications. For example, the compositions have good heat, light and air stability. They are resistant to chemical attack unless exposed to strong oxidizing agents, and possess high solvent resistance. Once applied properly as a thin film or coating to a suitably clean substrate surface, they adhere tenaciously to the surface and provide a durable coating that confers an extremely low coefficient of friction to the surface. The compositions are easy to handle and use, and in general, if used with reasonable care they are non-hazardous. Removal and clean-up can be easily accomplished with mild abrasive such as calcium carbonate in a soap or chlorine bleach solution.

Applications.

The compositions of this invention can be applied to substrate surfaces of a wide variety of articles of manufacture. Besides providing protection against exposure to air or moisture, these coatings can greatly reduce the friction which exists when an object is moved through a fluid medium such as air or water. Accordingly this aspect of the invention involves reducing the coefficient of friction of a surface which moves through and in contact with a fluid (e.g., air or water) by applying to that surface a film of a composition of this invention prior to moving the surface through the medium. Likewise, this invention provides a method of reducing friction between relatively moving solid surfaces by applying to at least one such surface a film of a composition of this invention. In this application, enhanced speeds, enhanced fuel economy, and enhanced performance can be realized for any solid object moving through a fluid or on another solid object.

Examples of articles that can be coated in this manner and thereby have the coefficient of friction of its surface(s) reduced significantly include boat hulls ranging from canoes and row-boats to submarines to ocean liners and supertankers; aircraft including air foils, fuselages, and tail assemblies; munitions such as bullets, cannon shells, mortar shells, rockets, ballistic missiles, etc.; sporting and leisure equipment such as golf balls, skis, sleds, sleighs, bobsleds, toboggans, ice skates, hockey pucks, surf boards, etc.; and machinery or mechanical equipment such as slideway machines, chutes, hoppers, gears, and the like.

Another important utility of the compositions of this invention is use as coatings to prevent water, ice, or foreign matter (e.g., dirt, dust, etc.) from adhering to a solid object. The friction-reducing and water-insolubility properties of the products enhance their ability to provide anti-icing and anti-soiling properties, as well as water repellant properties to surfaces to which the products have been applied. The compositions of this invention can also be used as coatings to prevent static electrical charge from building up on solid objects.

The compositions of this invention have the ability of penetrating and filling superficial imperfections in smooth surfaces. Thus the films or coatings applied to the substrate surface can bond very tightly to the surface and thereby provide a tough and durable coating. Moreover, such coatings exhibit excellent antiwear characteristics as well as low frictional properties. For speed and efficiency of application as a thin uniform coating, use of a power rotary buffer is highly desirable. Thus for medium to large scale applications of the compositions of this invention, e.g., when coating the exterior of aircraft, boats, motor vehicles, etc., the coating can be evenly applied and distributed by use for example of rotary polishing equipment such as a CYCLO Aircraft Orbital Polisher (Electric Models #5 or #5C, or Pneumatic Model #11A; Cyclo Manufacturing Company, Denver, Colo.).

Illustrations.

In order to still further illustrate the practice of this invention the following examples are presented. In these examples all parts are by weight unless otherwise specified. It will be appreciated that these examples are not intended to limit, and should not be construed as limiting, the invention.

EXAMPLE 1

Into a blending vessel equipped with a mechanical stirrer is placed 50 parts by weight of poly(dimethylsiloxane) fluid (MASILO® SF 5; PPG Industries). While continuously stirring the contents of the vessel a total of 950 parts of polytetrafluoroethylene micropowder homopolymer (Dupont Teflon MP 1100) is added in ten equal portions of 95 parts each. Each such incremental addition is followed by a five-minute interval to allow the stirred mixture to achieve homogeneity. The final product mixture is a gelatinous waxy semi-solid product containing by weight 95% of the polytetrafluoroethylene and 5% of the poly(dimethylsiloxane). The product substantially corresponds to the empirical formula $550(CF_2CF_2).10(CH_3)_2SiO$. The product has the following typical physical properties:

| | |
|---|---|
| Boiling Point, ° F. | >300 |
| Solubility in Water at 25° C. | Insoluble |
| Specific Gravity | 2.2 |
| Vapor Pressure, mm Hg at 25° C. | <5 |
| Vapor Density, (Air = 1) | >1 |
| Volatiles, % by volume | <5 |
| Appearance at 25° C. | White |
| Form | Semi-solid |
| Odor | Bland |
| Flash Point, PMCC, ° F. | >300 |

The product does not degrade over time in storage and does not oxidize or dry out on standing. It does not freeze, even at temperatures below zero degrees Fahrenheit. And, the product does not degrade or become less viscous or undergo phase separation when exposed to high temperatures (e.g., 450° F. (232° C.).

Table 1 gives Additional typical properties of the waxy product formed as in Example 1.

TABLE 1

| Property | ASTM Method | Values |
|---|---|---|
| Chemical and Solvent Resistance | D543 | Excellent |
| Coefficient of Friction | D1894 | |
| Dynamic (<3 m/min) | | 0.05–0.1 |
| Static (3.4 MPa) | | 0.02–0.05 |
| Flame Rating | UL94 | VO |
| Limiting Oxygen Index, % | D2863 | >95 |
| Dielectric Constant | D150 | |
| 1KHz–1GHz at 22° F. | | 2.1 |
| 1KHz–1GHz at 100° F. | | 2.04 |
| Dissipation Factor, 1MHz | D150 | 0.0001 |
| Resistivity, Ohm/cm | D257 | |
| Volume | | $>10^{18}$ |
| Surface | | $>10^{16}$ |
| Water Absorption, at 24 hr, % | D570 | <0.01 |
| Weather Resistance | D543 | Excellent |
| Apparent (Bulk) Density, g/L | D1457 | 2400–2600 |
| Temperature Service Range, ° C. | D1457 | –100 to 250 |
| Melting Peak Temperature, ° C. | D1457 | 310 to 330 |
| Abrasion Resistance, Film loss per Revolution, H-18 wheel, 1 kg load, mm | D3389 (Modified) | 0.002 |

EXAMPLE 2

In a blending vessel equipped with heating and mechanical stirring means is charged 450 parts of poly(dimethylsiloxane) fluid (MASIL® SF 5; PPG Industries). After heating this fluid to approximately 93° C., 50 parts of hot liquid mineral paraffin (S & A Paraffin Wax Strohmeyer & Arpe Co., Inc.) also at a temperature of approximately 93° C. is added to the siloxane fluid with constant stirring. This hot blend is continuously mixed while allowing the blend to cool to room temperature. When the blend has reached room temperature a total of 500 parts of polytetrafluoroethylene micropowder homopolymer (Dupont Teflon MP 1100) is added in ten equal portions of 50 parts each. Each such incremental addition is followed by a five-minute interval to allow the stirred mixture to achieve homogeneity. The final product mixture is a liquid waxy product containing by weight 50% of the polytetrafluoroethylene, 45% of the poly(dimethylsiloxane) and 5% of the paraffin. This product is suitable for use as a liquid wax for achieving the benefits made possible by the practice of this invention.

EXAMPLE 3

The procedure of Example 2 is repeated except that the proportions used are 420 parts of the poly(dimethylsiloxane) fluid 80 parts of the hot liquid mineral paraffin and 500 parts of the polytetrafluoroethylene micropowder homopolymer. This product is also a liquid wax suitable for use pursuant to this invention.

EXAMPLE 4

The procedure of Example 2 is repeated except that the proportions used are 250 parts of the poly(dimethylsiloxane) fluid 200 parts of the hot liquid mineral paraffin and 550 parts of the polytetrafluoroethylene micropowder homopolymer. This product is semi-solid paste wax possessing the advantageous properties referred to above.

EXAMPLE 5

The procedure of Example 2 is repeated except that the proportions used are 300 parts of the poly(dimethylsiloxane) fluid 150 parts of the hot liquid mineral paraffin and 550 parts of the polytetrafluoroethylene micropowder homopolymer. This product is another semi-solid paste wax possessing the advantageous properties achievable by the practice of this invention.

This invention is susceptible to considerable variation in its practice. For example, the basic compositions may be used to create a variety of lubricating fluids, greases and paints. Therefore, it is not intended that this invention be limited by the specific exemplifications set forth hereinabove. Rather, what is intended to be covered hereby is all subject matter within the spirit and scope of the appended claims, including the full range of equivalents to which such claims may be entitled as a matter of law.

What is claimed is:

1. A process consisting essentially of the steps of:
   blending particles of at least one fluoropolymer with at least one liquid polysiloxane; and
   controlling the rate of addition, the rate of blending, and the total quantity of said fluoropolymer relative to said polysiloxane to produce a substantially homogeneous semi-solid, grease-like mixture.

2. A process according to claim 1, wherein said fluoropolymer particles are finely divided and have an average particle size of less than 10 microns.

3. A process according to claim 1, wherein said fluoropolymer particles comprise finely divided friable particles.

4. A process according to claim 1, wherein said fluoropolymer is a perfluoropolymer and wherein said polysiloxane is composed of a polysiloxane backbone substituted by pendant hydrocarbyl groups directly attached to the backbone by carbon-to-silicone bonds.

5. A process according to claim 1, wherein said fluoropolymer is a perfluoropolymer and wherein said polysiloxane is a poly(dimethylsiloxane).

6. A process according to claim 1, wherein said fluoropolymer is a polytetrafluoroethylene polymer and wherein said polysiloxane is composed of a polysiloxane backbone substituted by pendant hydrocarbyl groups and by pendant polyoxyalkylene groups directly attached to the backbone by carbon-to-silicon bonds.

7. A process according to claim 1, wherein said fluoropolymer is a polytetrafluoroethylene polymer and wherein said polysiloxane is a poly(dimethylsiloxane).

8. A process according to claim 2, wherein said fluoropolymer is a polytetrafluoroethylene polymer.

9. A process according to claim 3, wherein said fluoropolymer is a polytetrafluoroethylene polymer.

10. A product produced by the process of claim 1.
11. A product produced by the process of claim 2.
12. A product produced by the process of claim 3.
13. A product produced by the process of claim 4.
14. A product produced by the process of claim 5.
15. A product produced by the process of claim 6.
16. A product produced by the process of claim 7.
17. A product produced by the process of claim 8.
18. A product produced by the process of claim 9.

* * * * *